United States Patent [19]

Knopp

[11] Patent Number: 4,679,222
[45] Date of Patent: Jul. 7, 1987

[54] METHOD AND MEANS FOR MARKING X-RAY FILM WITH IDENTIFYING INDICIA

[76] Inventor: Robert C. Knopp, 1693 Loras Blvd., Dubuque, Iowa 52001

[21] Appl. No.: 789,390

[22] Filed: Oct. 21, 1985

[51] Int. Cl.[4] ............................................. G03B 42/02
[52] U.S. Cl. ................................................... 378/166
[58] Field of Search ........................ 378/162, 165, 166

[56] References Cited

U.S. PATENT DOCUMENTS

| | | | |
|---|---|---|---|
| 3,573,455 | 4/1971 | Suierveld | 378/162 X |
| 3,846,634 | 11/1974 | Fleming | 378/166 |
| 3,864,038 | 2/1975 | Palazzolo | 378/166 X |
| 3,959,657 | 5/1976 | Kata et al. | 378/166 |

Primary Examiner—Frederick R. Schmidt
Assistant Examiner—Steven P. Schad
Attorney, Agent, or Firm—Zarley, McKee, Thomte, Voorhees & Sease

[57] ABSTRACT

The present invention uses the patient's history form for marking the patient identification indicia on to the X-ray for the patient. A patient identification section of the history form is placed in registered alignment with an unexposed patient identification portion of the X-ray film. Light is passed through the patient form and also through the patient identification portion of the film so as to transfer the image of the indicia in the history form onto the patient identification portion of the film. A light exposure box includes a window for exposing the film to the light through the patient history form.

2 Claims, 10 Drawing Figures

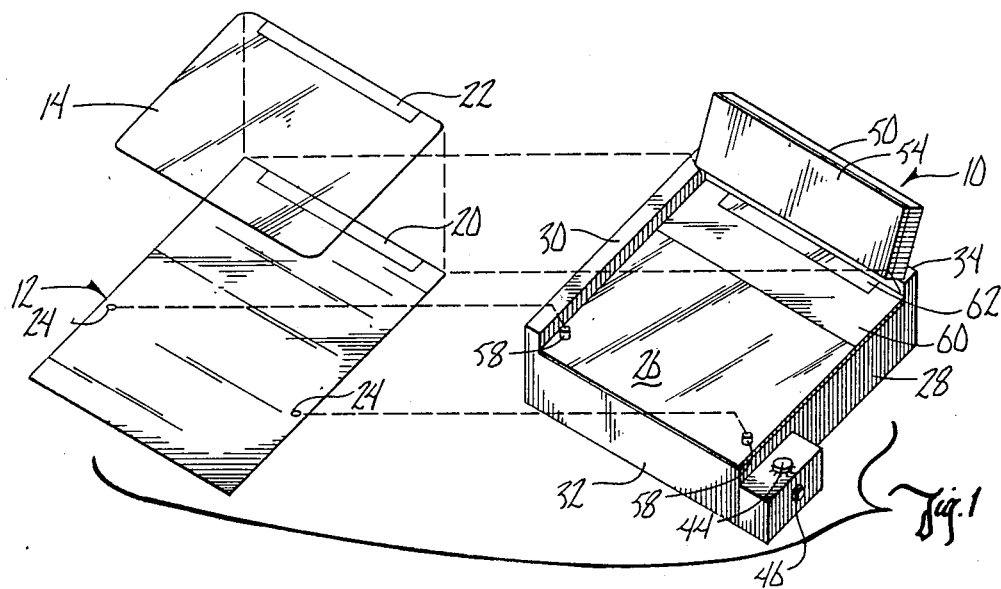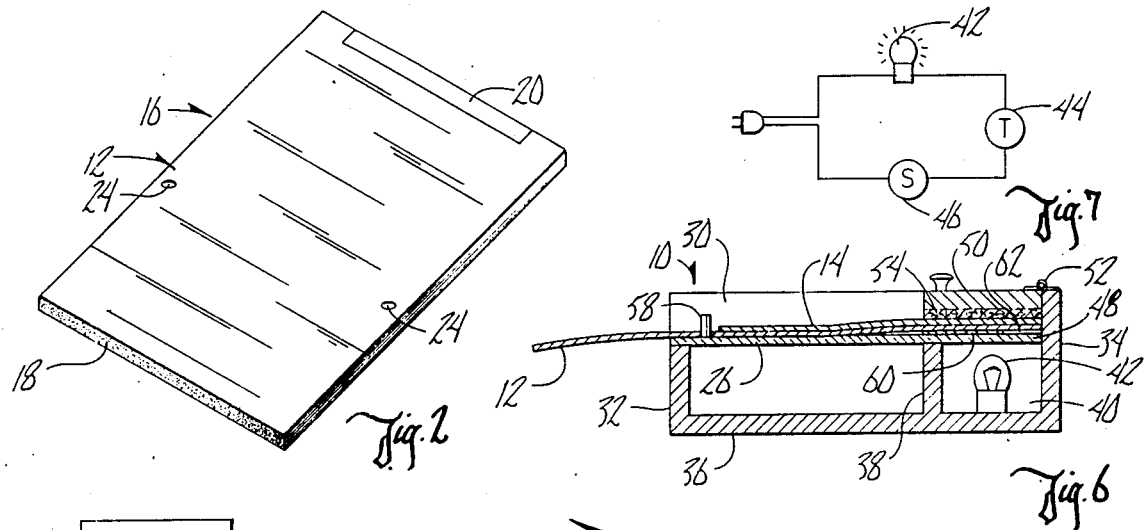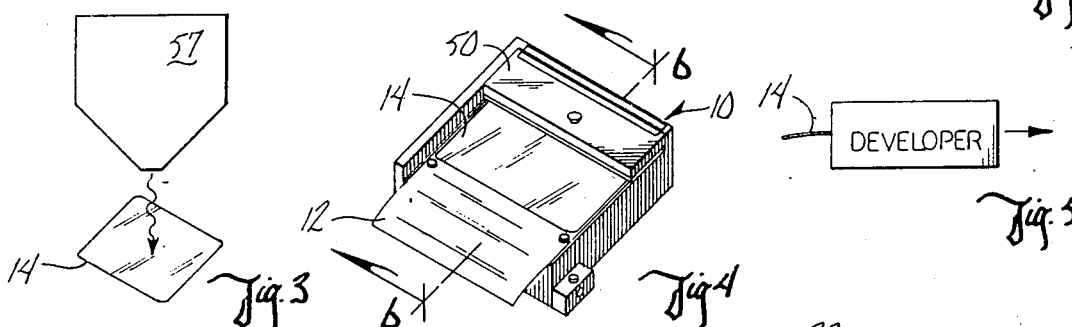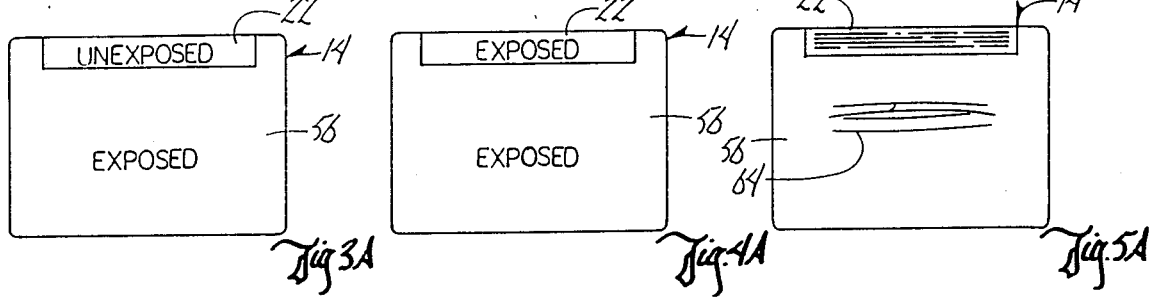

METHOD AND MEANS FOR MARKING X-RAY FILM WITH IDENTIFYING INDICIA

BACKGROUND OF THE INVENTION

This invention relates to a method and means for marking X-ray film with identifying indicia.

Properly identifying an X-ray with indicia indicating the name of the patient and other pertinent information, is a difficult and cumbersome problem particularly in the case of mamography examinations. When a patient is having an X-ray taken, the patient fills out a patient history form. Then the X-ray is taken. During the taking of the X-ray, a certain portion of the X-ray is blocked out so as to leave that portion unexposed.

After exposure of the X-ray film to X-rays, certain identifying indicia are placed on the as yet unexposed portion of the X-ray film. Different processes are used for placing these indicia on the film. One process involves using lead letters which are positioned on the X-ray. The film is then exposed to X-rays with the lead letters causing indicia to be transferred to the film. If lead letters are used, these letters are sometimes put in place prior to the taking of the X-ray, so that the indicia are placed on the X-ray film at the same time that the film is exposed to X-rays.

Another process involves placing typed gum labels superimposed over the unexposed portion of the X-ray film. In the case of mamography examinations a minimum of at least four such labels are required.

All of the above processes involve preparing a second set of identifying indicia in addition to the original set of identifying information placed on the patient history form.

Therefore, a primary object of the present invention is the provision of an improved method and means for marking X-ray film with identifying indicia.

A further object of the present invention is the provision of a method and means for transferring identifying indicia to the film which permits the use of the patient history form, and which eliminates the need for preparing a second set of indicia.

A further object of the present invention is the provision of a method and means for transferring identifying indicia to the X-ray film which utilizes the information originally placed on the patient history form without creating the likelihood of error in making a further transcription of the information on that form.

A further object of the present invention is the provision of a method and means which permits the patient history form to be superimposed in registered alignment over the X-ray film for transferring identifying indicia from the patient history form to the film.

A further object of the present invention is the provision of a device which is efficient in operation, economical in use and durable in construction.

SUMMARY OF THE INVENTION

The present invention utilizes a patient history form having a special field or section thereon containing the patient identification information which is desired to be transferred to the X-ray film. The patient history forms may be placed in a tablet, with the binding of the tablet being placed at the lower edges of the patient history forms, and with the patient identification portion being placed adjacent the upper edges of the patient history forms. The forms include a pair of punched registering holes therein.

The present invention utilizes a light exposure box in combination with the patient history forms described above. The box includes an upper surface having a window therein. Below the window is a light source compartment having a light source therein. The upper surface of the box includes a pair of posts which are positioned to fit within the registering holes of the patient history form so as to register the patient history form in proper position on the upper surface of the box with the patient identification section of the form in registered alignment over the window in the box.

The method of the present invention involves initially filling out the patient history form, and placing the patient identification information in the patient identification section of the history form.

Next, an X-ray is taken with conventional equipment, and the image is registered on an X-ray negative in conventional fashion. A lead shield is placed over a predetermined patient identification portion of the X-ray so that the patient identification portion will remain unexposed during the taking of the X-ray. The lead shield may be provided as part of a cassette which is used to frame the X-ray film during exposure to the X-rays. Alternatively a lead shield may also be put on the film receptor which holds the cassette. Next, in the darkroom environment, the patient history form is superimposed over the X-ray, with the patient identification section of the form being in registered vertical alignment over the patient identification portion of the X-ray film.

The X-ray film and the patient history form are then placed on the upper surface of the light exposure box, with the patient history form being between the X-ray film and the upper surface of the box. The register holes within the patient history form fit over a pair of posts on the upper surface of the light exposure box, so as to cause the patient identification section of the history form to be registered above the window of the light exposure box. Similarly, the patient identification portion of the X-ray film is also in registered alignment above the window and the patient identification section of the history form.

After properly positioning the film and the history form over the window of the box, the operator turns on the light source within the box for a predetermined length of time. The patient identification form is translucent, and therefore light passes through the window and also through the patient identification section of the patient history form. This permits the patient identification portion of the X-ray film to be exposed, and the images of the indicia on the patient identification section of the history form are transferred to the X-ray film.

The above described process eliminates the need for a second transcription of the patient identification information. Once the information is placed on the patient history form, it is transferred automatically to the X-ray negative without requiring any further transcribing. Thus, the information on the history form remains consistent from the history form to the X-ray film.

BRIEF DESCRIPTION OF THE FIGURES OF THE DRAWINGS

FIG. 1 is an exploded perspective view of the light exposure box, the patient history form, and the X-ray film.

FIG. 2 is a perspective view of a tablet of patient history forms.

FIG. 3 is a schematic view showing the step of exposing the X-ray film to X-rays.

FIG. 3A is a view of the film showing the exposed and unexposed portions of the film after the step in FIG. 3 is completed.

FIG. 4 is a perspective view of the light exposure box having the film and patient form therein.

FIG. 4A is a view of the film showing the condition of the film after the light exposure box has been used.

FIG. 5 is a schematic view showing the development of the film.

FIG. 5A is a view showing the film after it has been developed.

FIG. 6 is a sectional view taken along line 6—6 of FIG. 4.

FIG. 7 is a schematic electrical diagram of the circuitry within FIG. 6.

DETAILED DESCRIPTION OF THE PREFERRED EMBODIMENT

Referring to the drawing, the numeral 10 generally designates the light exposure box of the present invention. Box 10 is used in combination with a patient history form 12 and an X-ray film 14.

FIG. 2 shows a tablet 16 containing a plurality of patient history forms 12. Tablet 16 includes a binding 18 at the bottom thereof, holding all of the history forms 16 together. The binding 18 is not placed at the top of the form, because it can interfere with the use of the form with the process of the present invention. The top edges of the forms are each provided with a patient identification section 20 which contains the patient identifying information which is required to be transferred to the X-ray film. The remainder of the information on sheet 16 is history information needed for the patient's chart.

Film 14 includes a patient identification portion 22 which is sized and shaped to correspond with patient identification section 20 of each history form 16. History forms 16 are provided with a pair of spaced apart registering holes 24. While two registering holes 24 are shown, there may be more than two if desired, without detracting from the invention.

Light exposure box 10 includes a top surface 26, a pair of spaced apart side walls 28, 30, a front wall 32, a rear wall 34, and a bottom wall 36. A partition wall 38 forms a light source compartment 40 adjacent the rear of exposure box 10. Compartment 40 includes a light bulb or other light source 42 which is in a circuit with a timer 44 and switch 46 as shown in FIG. 7.

Top surface 26 is provided with a window 48 which includes glass or other light transparent material. This permits the light from bulb 42 to pass upwardly through window 48.

A hinged lid 50 is mounted by hinges 52 to the upper edge of rear wall 34 and includes a cushion material 54 thereon.

The first step of the present method involves filling out the patient history form. The patient identification information is written in the space provided by patient identification section 20. This information may vary depending according to the particular needs, but typical of such information would be the patient's name, the date, the patient's birth, the doctor's name, the hospital name, and the patient's number or history number. Other information may also be included if desired.

The remainder of the patient history form is filled out in conventional fashion.

FIG. 3 shows the next step of the process which involves taking the X-ray of the patient. An X-ray machine shown schematically as 57 in the drawings is used to take the X-ray of the patient and transfer the image of the object X-rayed to the film in an exposed portion of the film designated by the numeral 56. During this operation, a lead cover may be placed over the patient identification portion 22 so that the patient identification portion will remain unexposed after the taking of the X-ray.

Usually a cassette is utilized to hold the X-ray film 14 during the taking of the X-ray. In most cases, the cassette holding the X-ray includes a lead portion which blocks out the patient identification portion 28 so that a separate lead cover is not required.

After taking the X-ray, the cassette is opened in a darkroom environment so as not to further expose the film. In the darkroom environment, the patient history form is positioned on the upper surface of light exposure box 26 with the posts 58 on box 10 extending within the registering holes 24 in history form 12. In this position, the patient identification section 20 of the history form 12 is positioned in registered alignment above window 48. A light shield 60 is interposed between window 48 and patient history form 12. Shield 60 includes an opening 62 which is sized to correspond to the patient identification section 20 of patient history form 12. Shield 60 may be made of light opaque material or it may be made of a red material which permits only red light to pass therethrough. The red light which passes through shield 60 is not capable of exposing film.

After form 12 is placed in position on the upper surface of box 10, the film 14 is positioned thereover, with the patient identification portion 22 of film 14 being in registered alignment above patient identification section 20 of history form 12 and also in registered alignment above opening 62 of shield 60. Proper registration of the film is facilitated by the side wall 30 and the rear wall 34 of box 10. Lid 50 is then pivoted to the position shown in FIGS. 4 and 6 with the cushion 54 resting on the X-ray film 14.

Switch 46 and timer 44 are then actuated to cause light bulb 42 to be lit, thereby causing light to pass upwardly through window 48 and through opening 62 of shield 60. History form 12 is made of a light translucent paper, so that the light can pass through sheet 12 to the patient identification portion 22 of film 14. Exposing the patient identification portion 22 of film 14 to light for a predetermined time causes the images of the indicia in patient identification section 20 of history form 12 to be transferred to the patient identification section 22 of film 14.

The film 14 is then removed from light exposure box 10 and developed, thereby producing an image of the object X-rayed (designated by the numeral 64 in FIG. 5A) and also creating the image of the patient identification indicia within the portion 22 of film 14.

The present invention limits the number of times that a form must be filled out to one, i.e., the time when the patient history form is filled out. Furthermore, the patient identification information is transmitted directly from the form to the film without any further transcribing process, thereby eliminating the opportunity for error due to error in transcribing.

Thus, it can be seen that the device accomplishes at least all of its stated objectives.

What is claimed is:

1. A method for marking X-ray film with patient identifying indicia comprising:

filling out a patient history form having a patient identification portion and a patient medical history portion, said patient history form being light translucent, said filling out of said patient history form being accomplished by marking light opaque indicia on both said patient identification portion and said medical history portion, said patient identification portion having a predetermined size and shape;

exposing an X-ray portion of said X-ray film to X-rays with an object to be X-rayed placed between the source of said X-rays and said film;

blocking out an identifying area of said film corresponding in size and shape to said predetermined size and shape of said patient identification portion of said history form during said exposure to said X-rays so as to maintain said identifying area of said film in an unexposed condition;

placing a light shield over a window of an exposure box having a light source below said window, said light shield having an opening therein corresponding in size and shape to said patient identification portion of said medical history form, said shield being made of a material capable of preventing film exposing light rays from passing therethrough;

placing said patient history form over said shield on said window with at least two registration holes in said history form being fitted over two registration posts on said exposure box so as to cause said patient identification portion of said history form to be in registered alignment over said opening of said shield and so as to cause said medical history portion of said history form to be shielded by said shield from light emanating from said light source;

placing said X-ray film over said patient history form in a darkroom environment which protects said film from exposure;

registering said unexposed identifying portion of said film over said patient identification portion of said history form and over said opening of said shield with said exposed X-ray portion of said film being shielded from said light source by said shield;

actuating said light source to cause light to pass through said window, said opening of said shield, and only said patient identification portion of said history form whereby only said identifying area of said film will be exposed and the images of said light opaque indicia on only said identification portion of said history form will be transferred to said identification area of said film;

said filling out of said patient identification portion of said history form with said light opaque indicia being the only transcription of said light opaque indicia in the entire process of transferring the images of said light opaque indicia from said identification portion of said history form to said film.

2. In combination:

an X-ray film having a patient identifying portion and an X-ray exposed portion, said patient identification portion having a predetermined size and shape;

a light translucent patient history form having a patient identification section thereon with light opaque indicia being printed thereon and being sized and shaped to correspond to said patient identification portion of said film, said form also having a medical history section having a plurality of indicia thereon, said form having at least two registration holes therein;

an exposure box having an upper flat surface and a plurality of housing walls therebelow forming a light source chamber below said flat surface, said upper surface having a window therein and providing light communication from within said light source chamber to above said upper surface;

a light source within said chamber;

control means for actuating and deactuating said light source;

a pair of registration posts extending upwardly from said upper surface of said box;

shield means on said upper flat surface being made of a material capable of preventing film exposing light rays from passing therethrough, said shield means having an opening therein corresponding in size and shape to said patient identification section of said form;

said patient history form being positioned over said window and said shield means with said registering holes of said form being fitted over said registration posts of said box so as to hold said patient identification section of said form in registered alignment over said opening of said shield and so as to hold said medical history section of said form over the remainder of said shield;

said X-ray film being positioned over said form, said shield and said window in a position wherein said patient identification portion of said film is in registered alignment over said patient identification section of said form and over said opening of said shield and wherein said X-ray exposed portion of said film is shielded by said shield from film exposing light emanating from said light source, whereby actuation of said light source causes exposure of only said patient identification portion of said film and causes images of said indicia on said patient identification section of said form to be transferred to said patient identification portion of said film.

* * * * *